(12) United States Patent
Nakajima et al.

(10) Patent No.: US 11,190,541 B2
(45) Date of Patent: Nov. 30, 2021

(54) MONITOR DEVICE, BASE STATION, MONITORING METHOD, CONTROL METHOD, AND NON-TRANSITORY COMPUTER READABLE MEDIUM

(71) Applicant: NEC CORPORATION, Tokyo (JP)

(72) Inventors: Kazuaki Nakajima, Tokyo (JP); Shinji Masuda, Tokyo (JP); Toshiyuki Tamura, Tokyo (JP); Hidemi Ishikawa, Tokyo (JP); Masayuki Shinsho, Tokyo (JP)

(73) Assignee: NEC CORPORATION, Tokyo (JP)

( * ) Notice: Subject to any disclaimer, the term of this patent is extended or adjusted under 35 U.S.C. 154(b) by 68 days.

(21) Appl. No.: 15/768,315

(22) PCT Filed: Jul. 4, 2016

(86) PCT No.: PCT/JP2016/003172
§ 371 (c)(1),
(2) Date: Apr. 13, 2018

(87) PCT Pub. No.: WO2017/064824
PCT Pub. Date: Apr. 20, 2017

(65) Prior Publication Data
US 2018/0309783 A1 Oct. 25, 2018

(30) Foreign Application Priority Data
Oct. 15, 2015 (JP) .............................. JP2015-203626

(51) Int. Cl.
*H04L 29/06* (2006.01)
*G06F 21/55* (2013.01)
(Continued)

(52) U.S. Cl.
CPC .......... *H04L 63/1458* (2013.01); *G06F 21/55* (2013.01); *G06F 21/554* (2013.01);
(Continued)

(58) Field of Classification Search
None
See application file for complete search history.

(56) References Cited

U.S. PATENT DOCUMENTS 9,654,361 B2 * 5/2017 Vasseur ............... H04L 43/0876
2002/0188868 A1 * 12/2002 Budka .................... H04L 63/08
726/4
(Continued)

FOREIGN PATENT DOCUMENTS

JP    2004-241842 A    8/2004
JP    2014-511070 A    5/2014
(Continued)

OTHER PUBLICATIONS

"LTE RRC Connection Setup Messaging" [online] EventHelix.com Inc., 2012 [retrieved Feb. 9, 2021], URL: http://www.eventhelix.com/lte/attach/LTE-RRC-Connection-Setup-Messaging.pdf (Year: 2012).*

(Continued)

*Primary Examiner* — Taghi T Arani
*Assistant Examiner* — Joshua Raymond White

(57) ABSTRACT

An object is to provide a monitor device capable of reducing threat of DoS attacks on a mobile network. A monitor device (10) according to the present invention includes a signal monitor unit (11) for estimating a specific base station communicating with a communication terminal (30) attacking a mobile network according to the number of times an ATTACH procedure is rejected, in which the ATTACH procedure is for registering information about a communication terminal (30) communicating with a base station (20) in a communication device (40) located in the mobile network, and a base station control unit (12) for causing the specific base station to determine whether to execute the ATTACH procedure related to a communication terminal served by the specific base station according to communication terminal identification information set in a signal transmitted from the communication terminal served by the specific base station.

15 Claims, 15 Drawing Sheets

(51) Int. Cl.
*H04W 12/125* (2021.01)
*H04W 12/12* (2021.01)
*H04W 76/18* (2018.01)
*H04W 48/02* (2009.01)

(52) U.S. Cl.
CPC ......... *H04L 63/1416* (2013.01); *H04W 12/12* (2013.01); *H04W 12/125* (2021.01); *H04W 76/18* (2018.02); *H04W 48/02* (2013.01)

(56) References Cited

U.S. PATENT DOCUMENTS

| | | | |
|---|---|---|---|
| 2006/0128433 A1* | 6/2006 | Liang | H04W 68/025 455/560 |
| 2015/0033335 A1* | 1/2015 | Zhao | H04L 63/1416 726/22 |
| 2016/0044531 A1* | 2/2016 | Papa | H04W 28/0247 370/230 |

FOREIGN PATENT DOCUMENTS

| | | | |
|---|---|---|---|
| WO | 2012/112085 A1 | 8/2012 | |
| WO | 2014/049909 A1 | 4/2014 | |
| WO | WO-2016020012 A1 * | 2/2016 | ......... H04L 63/1458 |

OTHER PUBLICATIONS

3GPP TS 23.401 V13.3.0, 3rd Generation Partnership Project; Technical Specification Group Services and System Aspects; General Packet Radio Service (GPRS) enhancements for Evolved Universal Terrestrial Radio Access Network (E-UTRAN) access; (release 13), Jun. 2015, pp. 1-324.

International Search Report for PCT/JP2016/003172 dated Sep. 6, 2016 [PCT/ISA/210].

Communication dated Apr. 7, 2020, from the Japanese Patent Office in Application No. 2017-545076.

* cited by examiner

| Bits | | | | | | | | |
|---|---|---|---|---|---|---|---|---|
| 8 | 7 | 6 | 5 | 4 | 3 | 2 | 1 | |
| 0 | 0 | 0 | 0 | 0 | 0 | 1 | 0 | IMSI unknown in HSS |
| 0 | 0 | 0 | 0 | 0 | 0 | 1 | 1 | Illegal UE |
| 0 | 0 | 0 | 0 | 0 | 1 | 0 | 1 | IMEI not accepted |
| 0 | 0 | 0 | 0 | 0 | 1 | 1 | 0 | Illegal ME |

⋮

| | | | | | | | | |
|---|---|---|---|---|---|---|---|---|
| 0 | 0 | 0 | 0 | 1 | 0 | 0 | 0 | EPS services and non-EPS services not allowed |
| 0 | 0 | 0 | 0 | 1 | 0 | 0 | 1 | UE identity cannot be derived by the network |

⋮

| | | | | | | | | |
|---|---|---|---|---|---|---|---|---|
| 0 | 0 | 0 | 1 | 1 | 0 | 1 | 0 | Non-EPS authentication unacceptable |

⋮

| | | | | | | | | |
|---|---|---|---|---|---|---|---|---|
| 0 | 1 | 1 | 0 | 0 | 0 | 0 | 0 | Invalid mandatory Information |
| 0 | 1 | 1 | 0 | 0 | 0 | 0 | 1 | Message type non-existent or not implemented |

⋮

| | | | | | | | | |
|---|---|---|---|---|---|---|---|---|
| 0 | 1 | 1 | 0 | 0 | 1 | 0 | 0 | Conditional IE error |

⋮

| | | | | | | | | |
|---|---|---|---|---|---|---|---|---|
| 0 | 1 | 1 | 0 | 1 | 1 | 1 | 1 | Protocol error, unspecified |

Fig. 12

MONITOR DEVICE, BASE STATION, MONITORING METHOD, CONTROL METHOD, AND NON-TRANSITORY COMPUTER READABLE MEDIUM

CROSS REFERENCE TO RELATED APPLICATIONS

This application is a National Stage of International Application No. PCT/JP2016/003172, filed on Jul. 4, 2016, which claims priority from Japanese Patent Application No. 2015-203626, filed on Oct. 15, 2015.

TECHNICAL FIELD

The present invention relates to a monitor device, a base station, a monitor method, a control method, and a program. In particular, the present invention relates to a monitor device, a base station, a monitor method, a control method, and a program for monitoring an attack on a mobile network.

BACKGROUND ART

A device constituting a mobile network executes various processes in order for communication terminals to communicate using a mobile network operated by a mobile phone carrier. Non Patent Literature 1 describes an ATTACH procedure of a communication terminal. By executing the ATTACH procedure, authentication of the communication terminal, setting of communication bearers used for the communication terminal to transmit and receive data, and the like are performed.

CITATION LIST

Non Patent Literature

Non Patent Literature 1: 3GPP TS23.401 V13.3.0 (2015-06)

SUMMARY OF INVENTION

Technical Problem

In recent years, the threat of DoS (Denial of Service) attacks on mobile networks has been increasing. For example, when many control signals are transmitted to the mobile network, a large load is imposed on a node device that is responsible for processing the control signals inside the mobile network. Further, many control signals transmitted inside the mobile network could cause congestion in a transmission line. In order to provide global roaming services from all over the world, mobile phone carriers need to perform control in cooperation with mobile networks operated by other mobile phone carriers when authenticating communication terminals and the like. Thus, the DoS attacks on the mobile network may affect not only the mobile network operated by one mobile phone carrier, but also the mobile networks operated by a plurality of mobile phone carriers.

Therefore, in order to stably operate the mobile network, it is desired to reduce the threat of DoS attacks on the mobile network.

An object of the present invention to provide a monitor device, a base station, a monitor method, a control method, and a program capable of reducing threat of DoS attacks on a mobile network.

Solution to Problem

A first example aspect of the present invention is a monitor device including: a signal monitor unit configured to estimate a specific base station communicating with a communication terminal attacking a mobile network according to the number of times an ATTACH procedure is rejected, the ATTACH procedure being for registering information about the communication terminal communicating with a base station in a communication device located in the mobile network; and a base station control unit configured to cause the specific base station to determine whether to execute the ATTACH procedure related to a communication terminal served by the specific base station according to communication terminal identification information set in a signal transmitted from the communication terminal served by the specific base station.

A second example aspect of the present invention is a base station including:
a signal monitor unit configured to estimate whether there is a communication terminal attacking a mobile network in a communication area according to the number of times an ATTACH procedure is rejected, the ATTACH procedure being for registering information about the communication terminal located in a communication area formed by the base station in a communication device; and a signal control unit configured to determine whether to execute the ATTACH procedure related to a communication terminal according to communication terminal identification information set in a signal transmitted from the communication terminal located in the communication area.

A third example aspect of the present invention is a monitor method including: estimating a specific base station communicating with a communication terminal attacking a mobile network according to the number of times an ATTACH procedure is rejected, the ATTACH procedure being for registering information about the communication terminal communicating with a base station in a communication device located in the mobile network; and causing the specific base station to determine whether to execute the ATTACH procedure related to a communication terminal served by the specific base station according to communication terminal identification information set in a signal transmitted from the communication terminal served by the specific base station.

A fourth example aspect of the present invention is a control method including: estimating whether there is a communication terminal attacking a mobile network in a communication area according to the number of times an ATTACH procedure is rejected, the ATTACH procedure being for registering information about the communication terminal located in a communication area formed by a base station in a communication device; and determining whether to execute the ATTACH procedure related to a communication terminal according to communication terminal identification information set in a signal transmitted from the communication terminal located in the communication area.

A fifth example aspect of the present invention is a program that causes a computer to: estimate a specific base station communicating with a communication terminal attacking a mobile network according to the number of times an ATTACH procedure is rejected, the ATTACH procedure being for registering information about the communication terminal communicating with a base station in a communication device located in the mobile network; and cause the specific base station to determine whether to execute the ATTACH procedure related to a communication terminal served by the specific base station according to communication terminal identification information set in a signal Advantageous Effects of Invention The present invention can provide a monitor device, a base station, a monitor method, a control method, and a program capable of reducing the threat of DoS attacks on a mobile network.

BRIEF DESCRIPTION OF DRAWINGS

FIG. 12 is a diagram showing a list of Cause values according to a third embodiment;

DESCRIPTION OF EMBODIMENTS

First Embodiment

Figure 1:
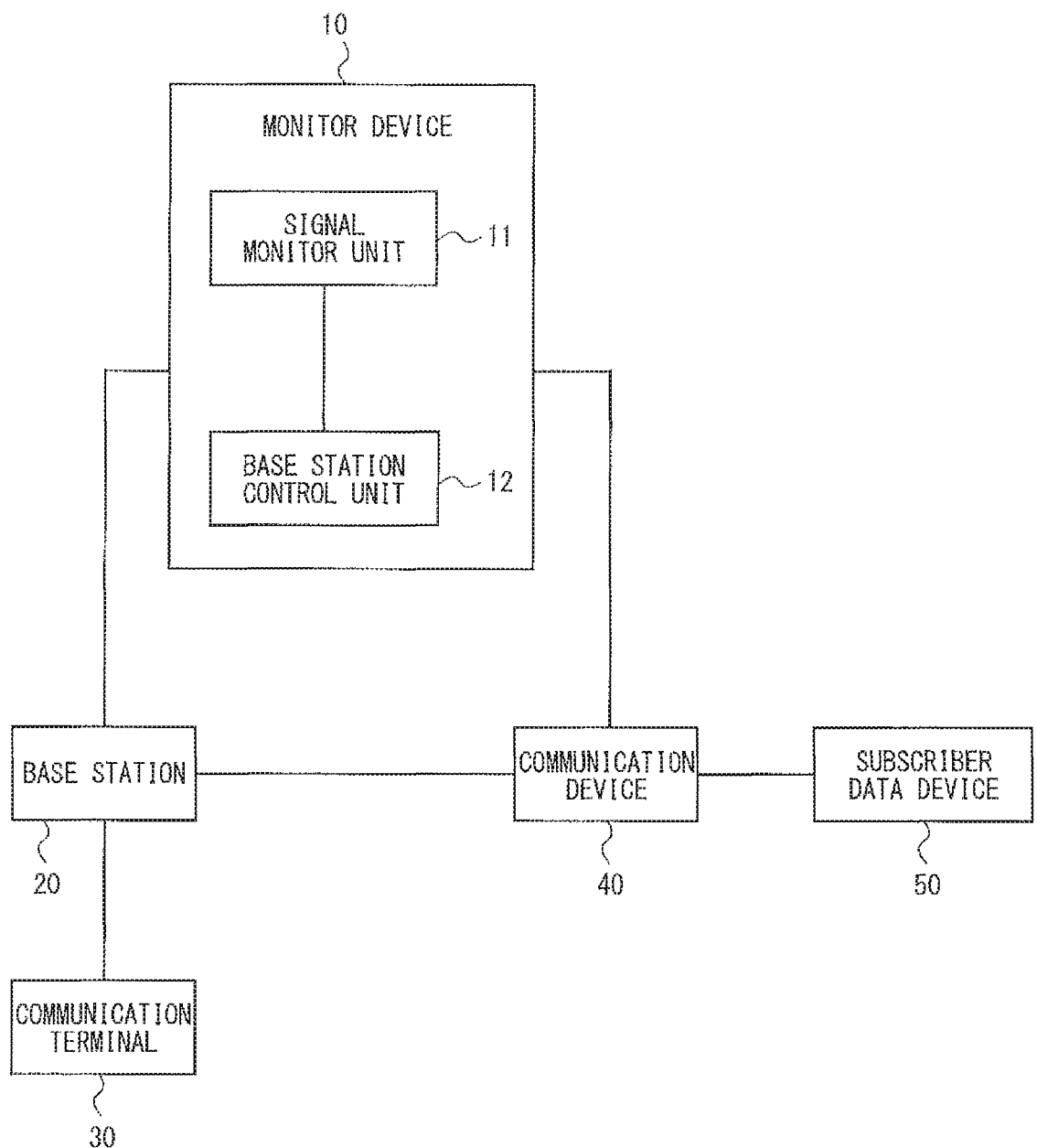
FIG. 1 is a configuration diagram of a communication system according to a first embodiment.

Hereinafter, embodiments of the present invention will be described with reference to the drawings. A configuration example of a communication system according to a first embodiment of the present invention will be described with reference to FIG. 1. The communication system of FIG. 1 includes a monitor device 10, a base station 20, a communication terminal 30, a communication device 40, and a subscriber data device 50. The monitor device 10, the base station 20, the communication terminal 30, the communication device 40, and the subscriber data device 50 may be computer devices that operate when a processor executes a program stored in a memory.

The base station 20, the communication device 40, and the subscriber data device 50 may be node devices defined by 3rd Generation Partnership Project (3GPP). For example, the base station 20 may be a NodeB or an eNB (evolved NodeB). The communication device 40 may be an SGSN (Serving GPRS Support Node) or an MME (Mobility Management Entity). Further, the subscriber data device 50 may be an HSS (Home Subscriber Server) or an HLR (Home Location Register).

The communication terminal 30 is a terminal that performs radio communication with the base station 20. The communication terminal 30 may be, for example, a mobile phone terminal, a smartphone, a tablet terminal, or the like. Alternatively, the communication terminal 30 may be an M2M (Machine to Machine) terminal, an MTC (Machine Type Communication) terminal, or the like.

Next, a configuration example of the monitor device 10 will be described. The monitor device 10 includes a signal monitor unit 11 and a base station control unit 12. The signal monitor unit 11 and the base station control unit 12 may be software or modules in which processing is executed by the processor executing the program stored in the memory. Alternatively, the signal monitor unit 11 and the base station control unit 12 may be hardware such as circuits or chips.

The signal monitor unit 11 monitors the number of times an ATTACH procedure for registering information about the communication terminal 30 communicating with the base station 20 in the communication device 40 is rejected. Furthermore, the signal monitor unit 11 estimates the base station that communicates with the communication terminal attacking the mobile network according to a result of the monitoring. A base station that communicates with a communication terminal attacking the mobile network is hereinafter referred to as a specific base station. The specific base station may be a sector constituting a base station.

The mobile network is, for example, a network including the base station 20, the communication device 40, and the subscriber data device 50.

The ATTACH procedure is processing to enable the communication terminal 30 to use the mobile network. The information about the communication terminal 30 may be, for example, information about the location of the communication terminal 30.

The communication device 40 rejects to register the information about the communication terminal 30, for example, when authentication of the communication terminal 30 cannot be performed or when the communication terminal 30 cannot use the mobile network. Specifically, when the communication terminal 30 spoofs identification information of another communication terminal, it is determined that authentication of the communication terminal 30 cannot be performed. The communication device 40 may reject the registration of information about the communication terminal 30 by communicating with the subscriber data device 50 that holds subscriber information about the communication terminal 30.

For example, when the number of times of rejecting the registration of the information about the communication terminal served by the base station 20 in the communication device 40 exceeds a predetermined threshold, the signal monitor unit 11 estimates that there is a communication terminal attacking the mobile network served by the base station 20. That is, the signal monitor unit 11 estimates the base station 20 as the specific base station.

The base station control unit 12 instructs the base station 20 to determine whether to execute processing for registering the information about the communication terminal 30 and the like in the communication device 40 according to communication terminal identification information that is set in a signal transmitted from the communication terminal 30 or the like served by the base station 20, which is estimated to be the specific base station.

The base station 20 does not execute the processing for registering the information about all the communication terminals served by the base station 20 in the communication device 40. Instead, it does not execute the processing for registering the information about some or all of the communication terminals served by the base station 20 in the communication device 40 based on the communication terminal identification information.

As described above, the monitor device 10 can estimate the specific base station that communicates with the communication terminal attacking the mobile network using the communication system of FIG. 1. Further, the monitor device 10 can cause the specific base station to determine whether to execute the processing for registering the information about the communication terminal in the communication device 40.

This reduces the number of times that the base station 20 has to register the information about the communication terminals in the communication device 40. Therefore, even when there is a communication terminal that attacks the mobile network, it is possible to reduce an increase in the number of signals.

Second Embodiment

Figure 2:
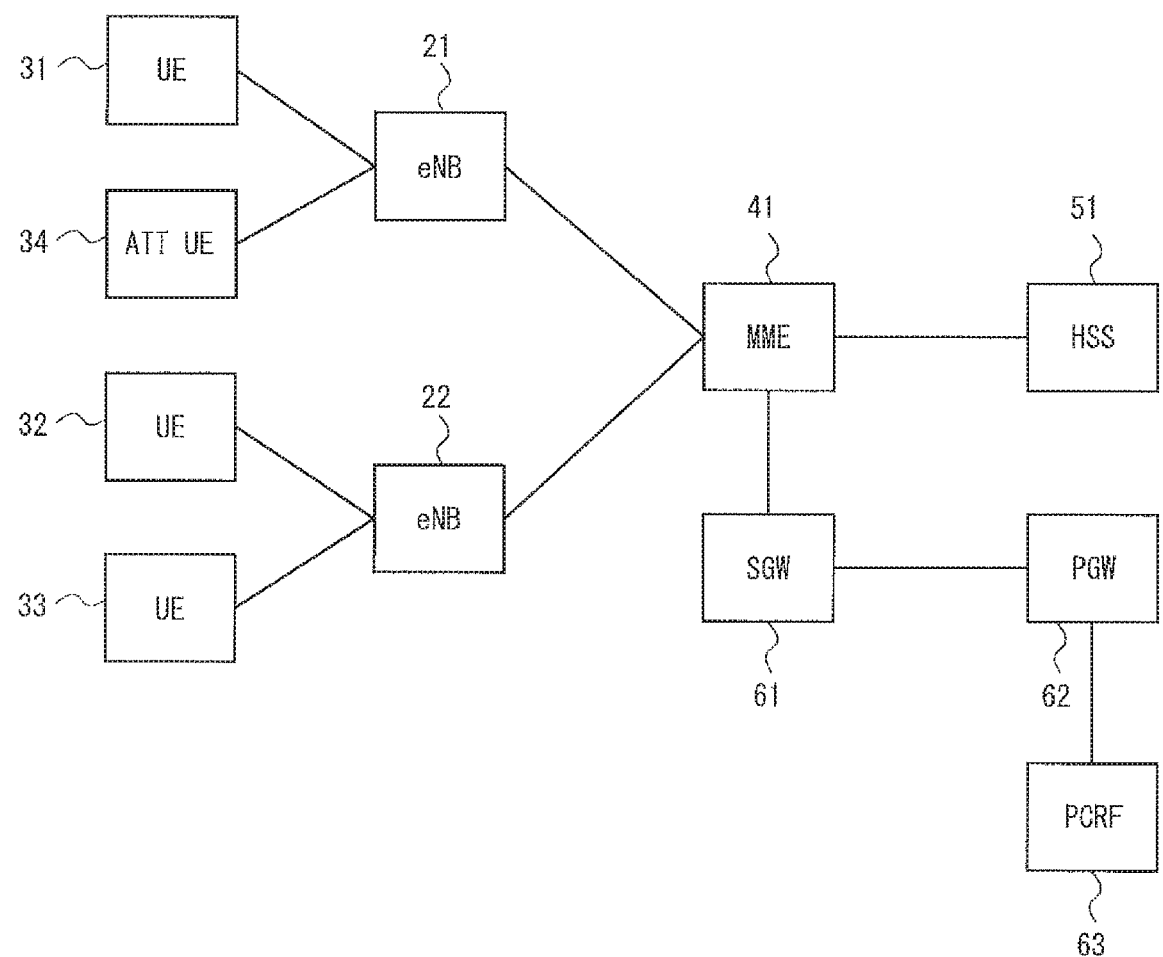
FIG. 2 is a configuration diagram of a mobile network according to a second embodiment.

Next, a configuration example of a mobile network according to a second embodiment of the present invention will be described with reference to FIG. 2. The mobile network of FIG. 2 is configured using a node device defined by 3GPP. The mobile network shown in FIG. 2 includes UEs (User Equipments) 31 to 33, an ATT (ATTACKER) UE 34, an eNB 21, an eNB 22, an MME 41, an HSS 51, an SGW (Serving Gateway) 61, a PGW (Packet Data Network Gateway) 62, and a PCRF (Policy and Charging Rule Function) 63.

FIG. 2 shows communication paths of control data or C-Plane data mainly used for setting PDN Connections or communication bearers regarding the UEs 31 to 33 and the ATT UE 34.

The UEs 31 to 33 and the ATT UE 34 correspond to the communication terminal 30 in FIG. 1. The UE is a generic term for communication terminals in 3GPP. Further, the ATT UE 34 indicates a UE that attacks the mobile network.

The eNB 21 and the eNB 22 correspond to the base station 20 in FIG. 1. The eNB 21 and the eNB 22 are base stations that support LTE as a radio communication scheme.

The MME 41 corresponds to the communication device 40 in FIG. 1. The MME 41 manages the location information of the UEs 31 to 33 and the ATT UE 34. The HSS 51 corresponds to the subscriber data device 50 in FIG. 1. The HSS 51 manages the subscriber information of the UEs 31 to 33 and the ATT UE 34.

The SGW 61 and the PGW 62 are gateway devices that transmit user data related to the UEs 31 to 33 and the ATT UE 34. The user data may be referred to as U-Plane data.

The PCRF 63 is a device that executes QoS (Quality of Service) control and accounting control related to the UEs 31 to 33 and the ATT UE 34. Further, the PCRF 63 may be referred to as a PCRF entity, a PCRF device, or the like.

Here, an attack on the mobile network executed by the ATT UE 34 will be described. The ATT UE 34 performs, for example, a DoS attack on the mobile network. Specifically, the ATT UE 34 repeatedly executes the Initial Attach procedure to increase the amount of the control data transmitted in the mobile network. The increase in the amount of control data causes an increase in the amount of processing for each node device in the mobile network to execute, thereby increasing the processing load of the node device.

Figure 3:
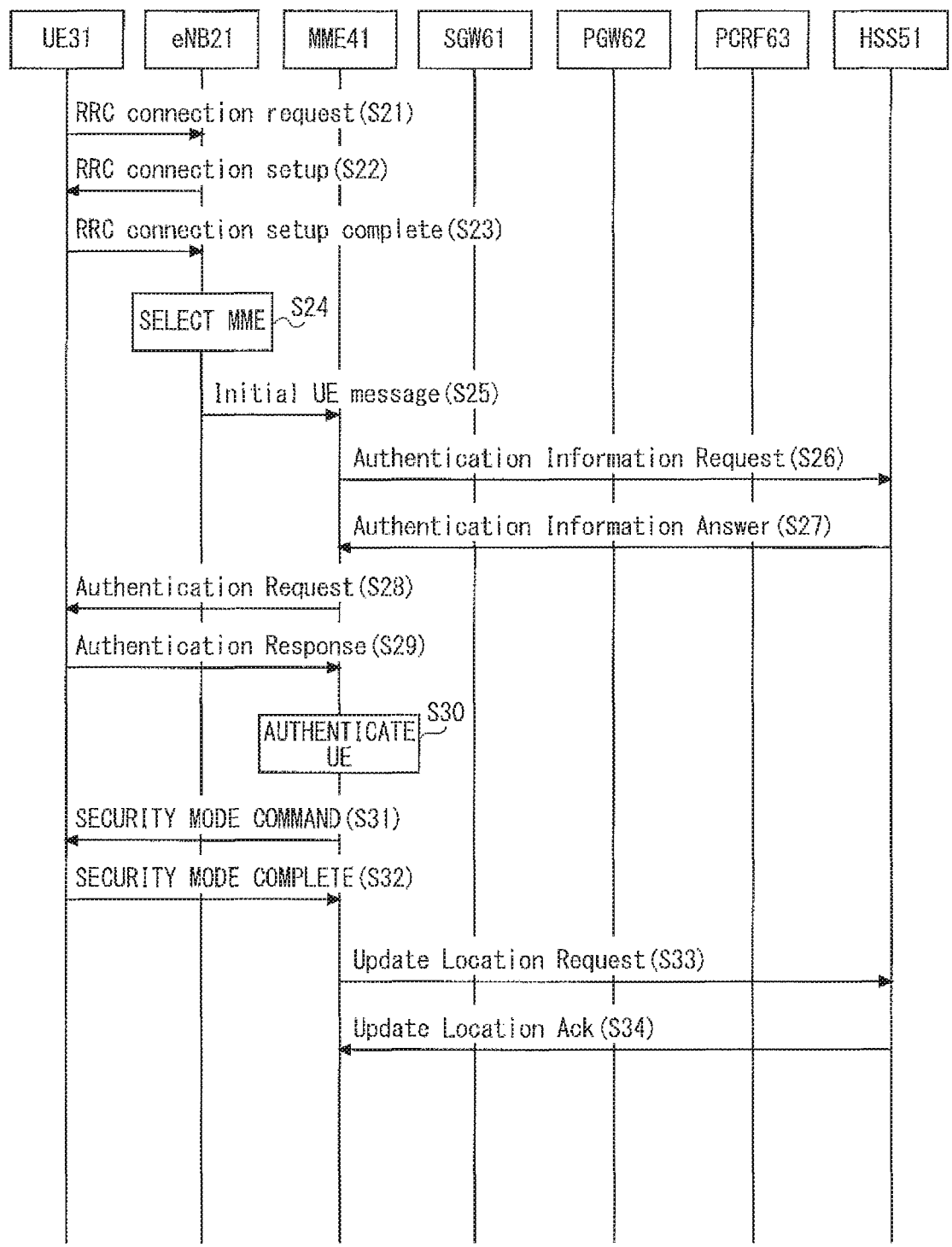
FIG. 3 is a diagram showing an overview of an Initial Attach procedure according to the second embodiment.
Figure 4:
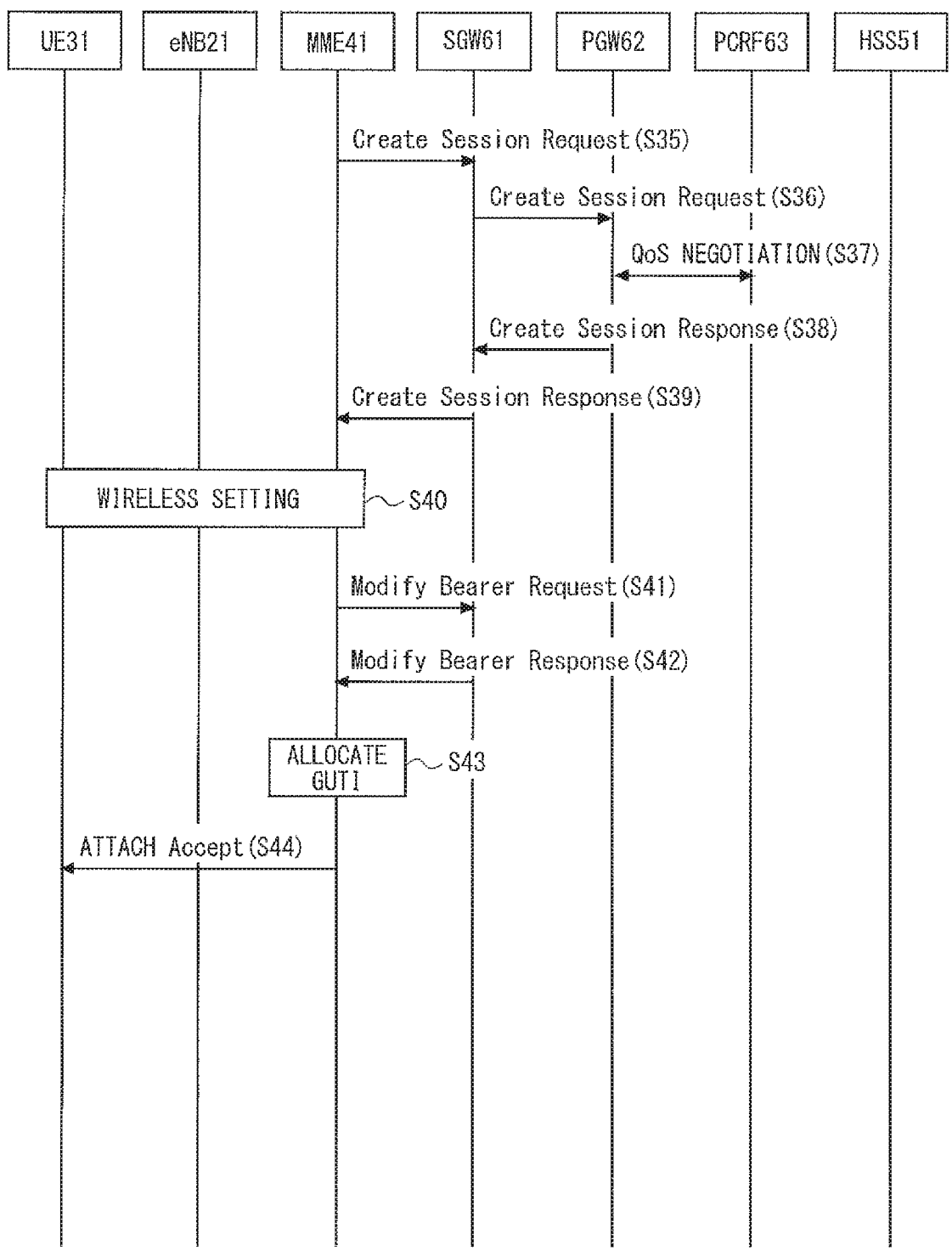
FIG. 4 is a diagram showing an overview of the Initial Attach procedure according to the second embodiment.

An overview of the Initial Attach procedure defined by 3GPP will be described with reference to FIGS. 3 and 4. In FIGS. 3 and 4, an overview of the Initial Attach procedure of the common UE 31 that does not attack the mobile network is described. The Initial Attach procedure is executed when the UE 31 is powered on for the first time or when the UE 31 roams from a foreign country and communicates with the eNB 21 for the first time.

First, the UE 31 transmits an RRC (Radio Resource Control) connection Request message to the eNB 21 (S21). When the UE 31 communicates with the eNB 21 for the first time, security is not ensured for a radio section between the UE 31 and the eNB 21. Thus, in Step S21, the UE 31 sets a predetermined value in an RRC connection request message as the identification information of the UE 31. The predetermined value may be referred to as, for example, a random value. The UE 31 sets, for example, the information of UE identity=random value in the RRC connection request message.

Next, the eNB 21 transmits an RRC connection setup message to the UE 31 as a response message to the RRC connection request message (S22). Next, the UE 31 transmits an RRC connection setup complete message including a NAS message used in the NAS (Non-Access Stratum) protocol to the eNB 21 (S23). For example, an ATTACH request message is set as the NAS message. The UE 31 sets an IMSI (International Mobile Subscriber Identity) as the identification information of the UE 31 in the ATTACH request message. Specifically, the UE 31 sets Mobile Identity=IMSI in the ATTACH request message. The IMSI is an identification number uniquely identifying a UE in all mobile networks operated by a communication carrier.

Next, the eNB 21 selects an MME that manages the location information about the UE 31 (S24). For example, the eNB 21 may select the MME in consideration of the load status and the like of the MME. In this example, it is assumed that the eNB 21 has selected the MME 41.

Next, the eNB 21 transmits, to the MME 41, an Initial UE message including the ATTACH request message in which Mobile Identity=IMSI is set (S25).

Next, the MME 41 transmits, to the HSS 51, an Authentication Information Request message in which the IMSI of the UE 31 is set in order to execute authentication processing on the UE 31 (S26). Next, the HSS 51 transmits, to the MME 41, an Authentication Information Answer message including Authentication Vectors associated with the IMSI of the UE 31 (S27). Authentication Vectors include parameters necessary for the MME 41 to perform the authentication on the UE 31. Authentication Vectors include, for example, parameters such as RAND (Random challenge), AUTN (Authentication token), and XRES (Expected user response).

Next, the MME 41 transmits, to the UE 31, an Authentication Request message including RAND and AUTN transmitted from the HSS 51 (S28). Next, the UE 31 calculates a RES (User response) using the RAND and AUTN transmitted from the MME 41. The UE 31 transmits an Authentication Response message including the calculated RES to the MME 41 (S29).

Next, the MME 41 executes the authentication processing on the UE 31 using the RES transmitted from the UE 31 and the XRES transmitted from the HSS 51 (S30). Specifically, the MME 41 determines whether the RES and XRES match. When the RES and the XRES match, the MME 41 permits the UE 31 to use the mobile network. In Step S30, the MME 41 permits the UE 31 to use the mobile network.

Next, in order to establish a security association, the MME 41 transmits, to the UE 31, a SECURITY MODE COMMAND message including a security algorithm used in the security association (S31). Next, the UE 31 transmits a SECURITY MODE COMPLETE message to the MME 41 as a response message to the SECURITY MODE COMMAND message (S32).

Next, the MME 41 transmits an Update Location Request message to the HSS 51 in order to update the location information about the UE 31 held in the HSS 51 (S33). Next, the HSS 51 transmits an Update Location Ack message to the MME 41 as a response message to the Update Location Request message (S34).

Next, the MME 41 transmits a Create Session Request message to the SGW 61 in order to set a communication bearer (S35). Further, the SGW 61 transmits the Create Session Request message to the PGW 62 (S36). Next, the PGW 62 exchanges messages related to QoS negotiation with the PCRF 63 (S37) in order to determine QoS applied to the PDN (Packet Data Network) Connection related to the UE 31.

Next, the PGW 62 transmits a Create Session Response message to the SGW 61 as a response message to the Create Session Request message in Step S36 (S38). Further, the SGW 61 transmits a Create Session Response message to the MME 41 as a response message to the Create Session Request message in Step S35 (S39).

Next, the MME 41 performs wireless setting between the UE 31 and the eNB 21 (S40). Next, after the wireless setting, the MME 41 transmits and receives a Modify Bearer Request message and a Modify Bearer Response message to and from the SGW 61 in order to update the communication bearer (S41 and S42).

Next, the MME 41 allocates a GUTI (Globally Unique Temporary Identity) as temporary identification information of the UE 31 to the UE 31 (S43). Next, the MME 41 transmits an ATTACH Accept message including the GUTI to the UE 31 (S44).

When the processing up to Step S44 is executed and the ATTACH processing is successfully completed, the UE 31 has the GUTI. After that, when the UE 31 executes the ATTACH procedure again, the UE 31 sets UE identity=S-TMSI (SAE-Temporary Mobile Subscriber Identity) in the RRC connection Request message transmitted in Step S21. The S-TMSI is a value included in the GUTI as information for identifying the UE 31. That is, when the UE 31 executes the ATTACH procedure again, UE identity=S-TMSI is set instead of setting UE identity=random value.

Here, the Initial Attach procedure executed by the ATT UE 34 intending to attack the mobile network will be described. For example, as an attack method using the ATT UE 34, there may be the following attacks.

(1) The Initial Attach procedure is executed using an IMSI, in which the number of bits, the number form, or the like is illegal, as the identification information of the ATT UE 34.

(2) An IMSI having a value not managed by any mobile network operated by the communication carrier is set as the identification information of the ATT UE 34, and the Initial Attach procedure is executed.

(3) An IMSI of another UE is set as the identification information of the ATT UE 34, and the ATT UE 34 spoofs the other UE and executes the Initial Attach procedure.

A flow of processing when the ATT UE 34 executes the above-described attack (1) will be described with reference to FIG. 5. Steps S51 to S55 are the same as Steps S21 to S25 in FIG. 3, respectively, and thus a detailed description thereof will be omitted.

When the MME 41 receives the Initial UE message including the ATTACH request message in which an illegal IMSI is set in Step S55, the MME 41 transmits an Initial Context Setup Request message including an ATTACH reject message to the eNB 21 (S56). Next, the eNB 21 transmits an RRC connection Reconfiguration message including the ATTACH reject message to the ATT UE 34 (S57).

As described above, when the ATT UE 34 executes the above-described attack (1), the processing of Steps S51 to S57 is executed.

Figure 6:
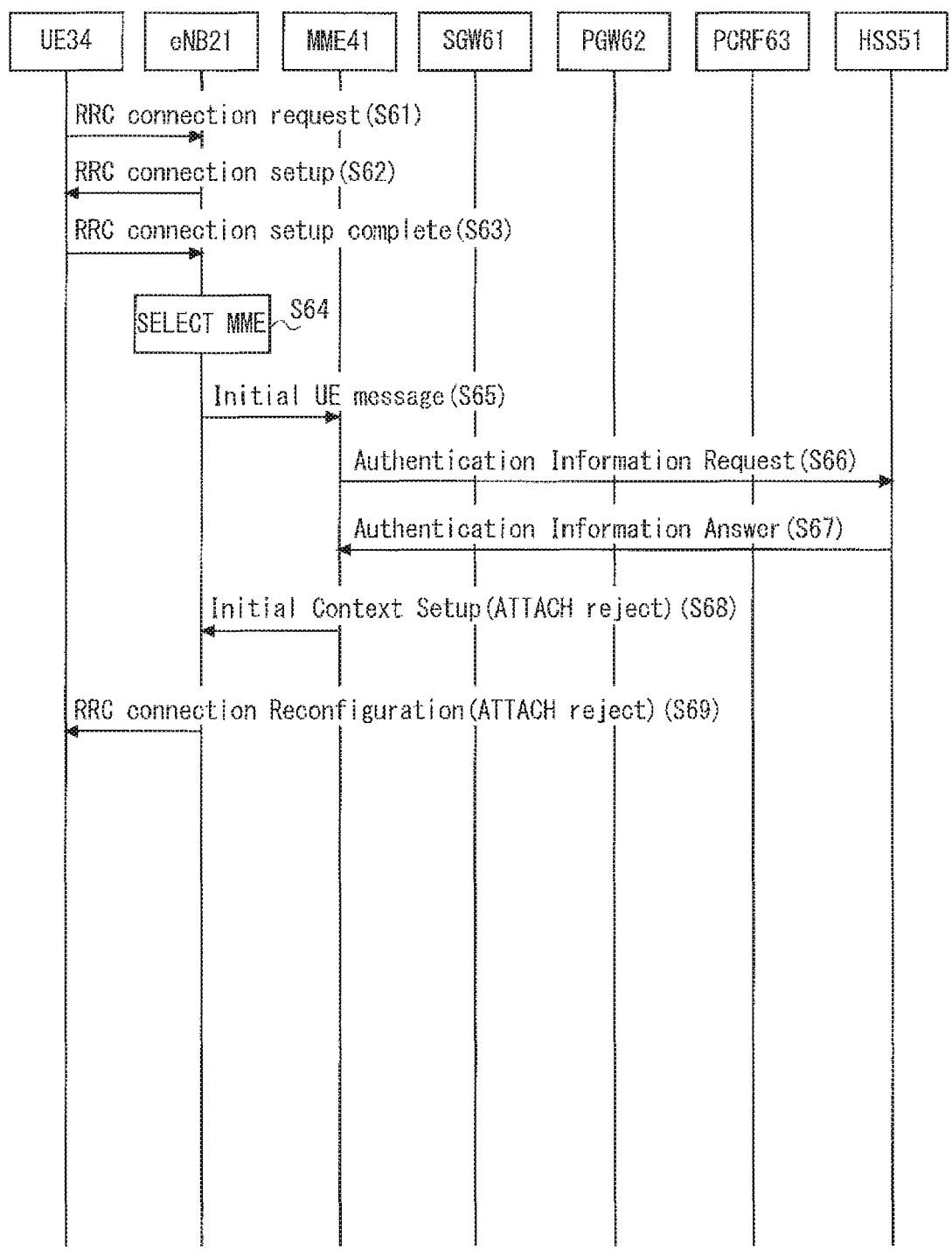
FIG. 6 is a diagram showing a flow of processing when the UE according to the second embodiment attacks.

Next, a flow of processing when the ATT UE 34 executes the above-described attack (2) will be described with reference to FIG. 6. Steps S61 to S66 are the same as Steps S21 to S26 in FIG. 3, respectively, and thus a detailed description thereof will be omitted. In Step S66, the HSS 51 receives an IMSI with a value that is not managed in any mobile network operated by the communication carrier. In this case, the HSS 51 transmits, to the MME 41, the Authentication Information Answer message in which a Cause indicating that the value of the received IMSI does not exist is set (S67). The Cause indicating that the value of the received IMSI does not exist may be, for example, EPS services and non-EPS services not allowed.

Next, when the MME 41 receives the Authentication Information Answer message in which the Cause indicating that the value of the received IMSI does not exist is set, the MME 41 transmits an Initial Context Setup message including the ATTACH reject message to the eNB 21 (S68). Next, the eNB 21 transmits the RRC connection reconfiguration message including the ATTACH reject message to the ATT UE 34 (S69).

As described above, when the ATT UE 34 executes the above-described attack (2), the processing of Steps S61 to S69 is executed.

Figure 7:
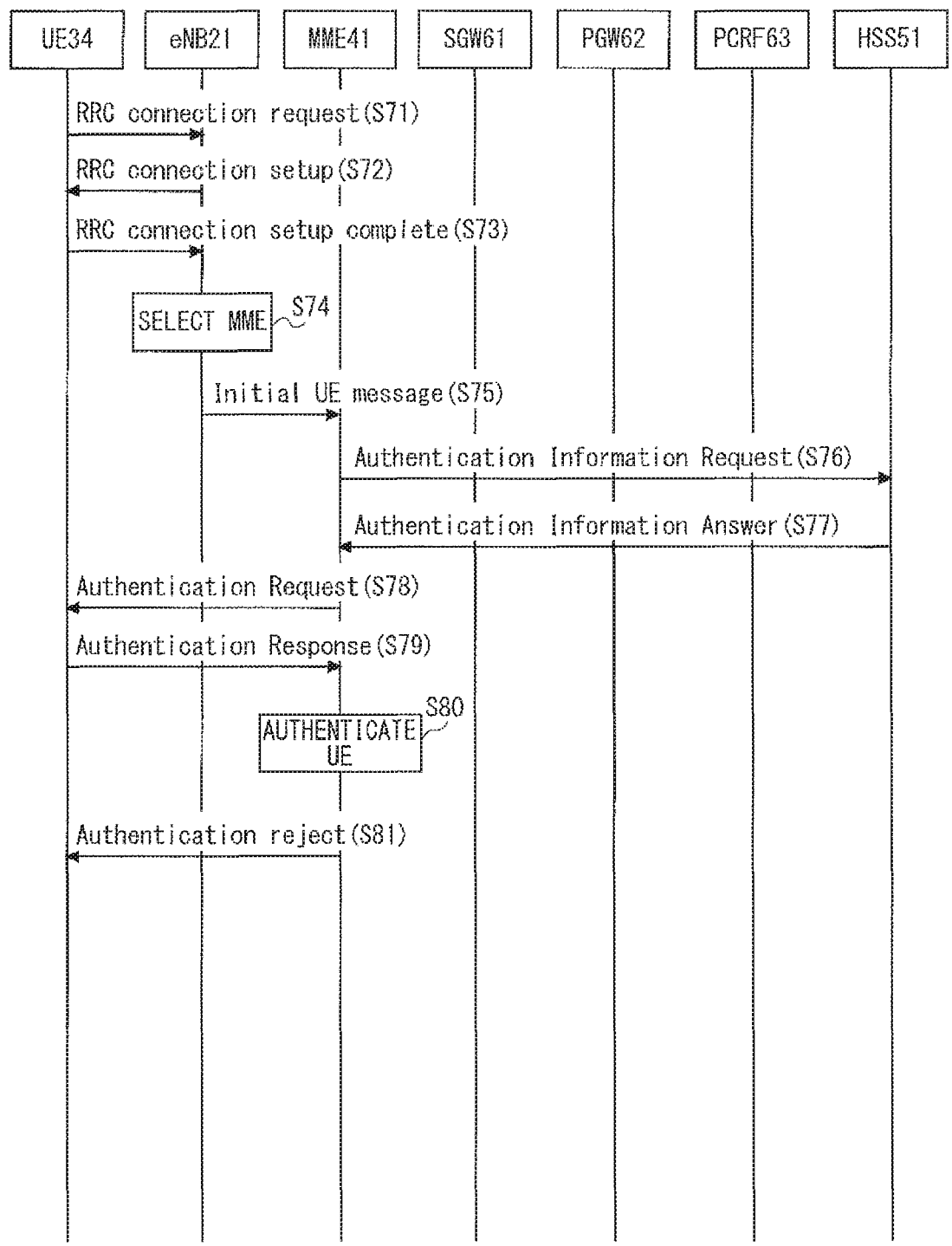
FIG. 7 is a diagram showing a flow of processing when the UE according to the second embodiment attacks.

Next, a flow of processing when the ATT UE 34 executes the above-described attack (3) will be described with reference to FIG. 7. Steps S71 to S79 are the same as Steps S21 to S29 of FIG. 3, respectively, and thus a detailed description thereof will be omitted.

The ATT UE 34 sets the IMSI of another UE to spoof the other UE. Thus, even when the RAND and AUTN transmitted in Step S78 are used, the ATT UE 34 cannot generate the RES having the same value as that of the XRES generated by the HSS 51. Thus, in authentication of the ATT UE 34, the MME 41 determines that the RES transmitted in Step S79 is different from the XRES transmitted in Step S77 (S80). That is, the MME 41 rejects the ATT UE 34 to use the mobile network.

Next, the eNB 21 transmits an Authentication reject message to the ATT UE 34 (S81).

As described above, when the ATT UE 34 executes the above-described attack (3), the processing of Steps S71 to S81 is executed.

Next, a configuration example of the eNB 21 according to the second embodiment of the present invention will be described with reference to FIG. 8. The eNB 21 includes an RRC signal monitor unit 71 and an NAS signal control unit 72. The NAS signal control unit 72 includes an NAS signal monitor unit 73 and a signal control unit 74.

The NAS signal monitor unit 73 corresponds to the signal monitor unit 11 of FIG. 1. The signal control unit 74 corresponds to the base station control unit 12 in FIG. 1.

That is, the NAS signal control unit 72 executes the same function as the function executed by the monitor device 10 in FIG. 1. In other words, FIG. 8 shows a configuration in which the monitor device 10 in FIG. 1 is included in the eNB 21, which is the base station 20.

The RRC signal monitor unit 71 monitors RRC signals transmitted from a plurality of UEs camping on a communication area formed by the eNB 21. The RRC signal monitor unit 71 may monitor the RRC signals transmitted and received by the eNB 21 at a predetermined time, such as every day, every week, every month, or every year, and generate statistical data about the number of RRC signals. By generating the statistical data, the RRC signal monitor unit 71 can know, for example, at what time of the day a large amount of traffic occurred, or on what day of the week a large amount of traffic occurred.

Further, the RRC signal monitor unit 71 may associate the statistical data with weather information, event information, and the like as a cause of the large amount of traffic. The event information may be, for example, an event where many people gather such as concerts and gatherings.

When the RRC signal monitor unit 71 detects an unusual trend of traffic by the generated statistical data, that is, when the RRC signal monitor unit 71 detects an abnormality in a network operation, it may execute processing to verify the presence of the ATT UE 34. The processing to verify the presence of the ATT UE 34 is executed by the NAS signal control unit 72. Thus, the RRC signal monitor unit 71 may activate the NAS signal control unit 72 when an abnormality in the network operation is detected. In this case, the NAS signal control unit 72 is usually in a stopped state.

The NAS signal monitor unit 73 monitors messages transmitted to and received from the MME 41. For example, the NAS signal monitor unit 73 counts the number of ATTACH reject messages received in Step S56 of FIG. 5 or Step S68 of FIG. 6. Further, the NAS signal monitor unit 73 counts the number of Authentication reject messages transmitted from the MME 41 in Step S81 of FIG. 7.

The NAS signal monitor unit 73 estimates that there is an ATT UE 34 when the number of ATTACH reject messages and the number of Authentication reject messages transmitted and received in a unit time exceed a predetermined threshold. The predetermined threshold may be a constant value or may be dynamically changed.

For example, the predetermined threshold may be dynamically changed based on the statistical data generated by the RRC signal monitor unit 71. Specifically, an analysis on the statistical data generated by the RRC signal monitor unit 71 enables an estimation about a time period, a day of the week, a season, a weather condition, or the like where a large amount or a small amount of traffic occurs. Thus, the threshold may be set high in a time period where the amount of traffic is large, and may be set low in a time period where the amount of traffic is small.

When the schedule for holding an event where many people gather is known beforehand, the threshold for the date at which the event is held may be set high.

When the NAS signal monitor unit 73 determines that the number of ATTACH reject messages and the number of Authentication reject messages transmitted and received in a unit time exceed a predetermined threshold, the signal control unit 74 rejects the Initial Attach procedure for some UEs among UEs located in the communication area formed by the eNB 21. For example, some UEs for which the Initial Attach procedure is rejected may be UEs in which the UE identity=random value is set in the RRC connection Request message. In other words, some UEs for which the Initial Attach procedure is rejected may be UEs in which the S-TMSI is not set in the UE identity in the RRC connection Request message.

Further, the signal control unit 74 may set a time for executing the processing for rejecting the Initial Attach procedure for some of the UEs located in the communication area formed by the eNB 21. When the set time has elapsed, the signal control unit 74 cancels the processing for rejecting the Initial Attach procedure for some of the UEs located in the communication area formed by the eNB 21.

The UE in which the UE identity=random value is set in the RRC connection Request message is the UE that is powered on for the first time, or the UE that roamed from another mobile network such as overseas. Further, many ATT UEs 34 cannot successfully complete the Initial Attach procedure as described in FIGS. 5 to 7. For this reason, when the ATT UE 34 repeatedly performs the Initial Attach procedure in order to attack the mobile network, the S-TMSI cannot be set in the UE identity. This is because the S-TMSI is the identification information included in the GUTI allocated to the UE when the Initial Attach procedure is completed successfully.

By rejecting the Initial Attach procedure of the UE in which the UE identity=random value is set in the RRC connection request message, the number of attacks executed by the ATT UE 34 can be reduced.

The Initial Attach procedure of the UEs that have no intention of attacking the mobile network and that have been powered on for the first time, or UEs roaming from other mobile networks, such as overseas, could also be rejected. With respect to such a UE, the processing for rejecting the Initial Attach procedure is canceled after a lapse of a certain time, and then the Initial Attach procedure can be successfully completed. The operation of rejecting the Initial Attach procedure of the UE in which the UE identity=random value is set is performed only on the specific base station. Thus, when the UE having no intention of attacking the mobile network moves to an area outside the specific base station, the Initial Attach procedure of the UE having no intention of attacking the mobile network can be successfully completed. However, the operation of rejecting the Initial Attach procedure of the UE in which the UE identity=random value is set may be performed on a plurality of base stations including neighbor base stations of the specific base station.

Figure 9:
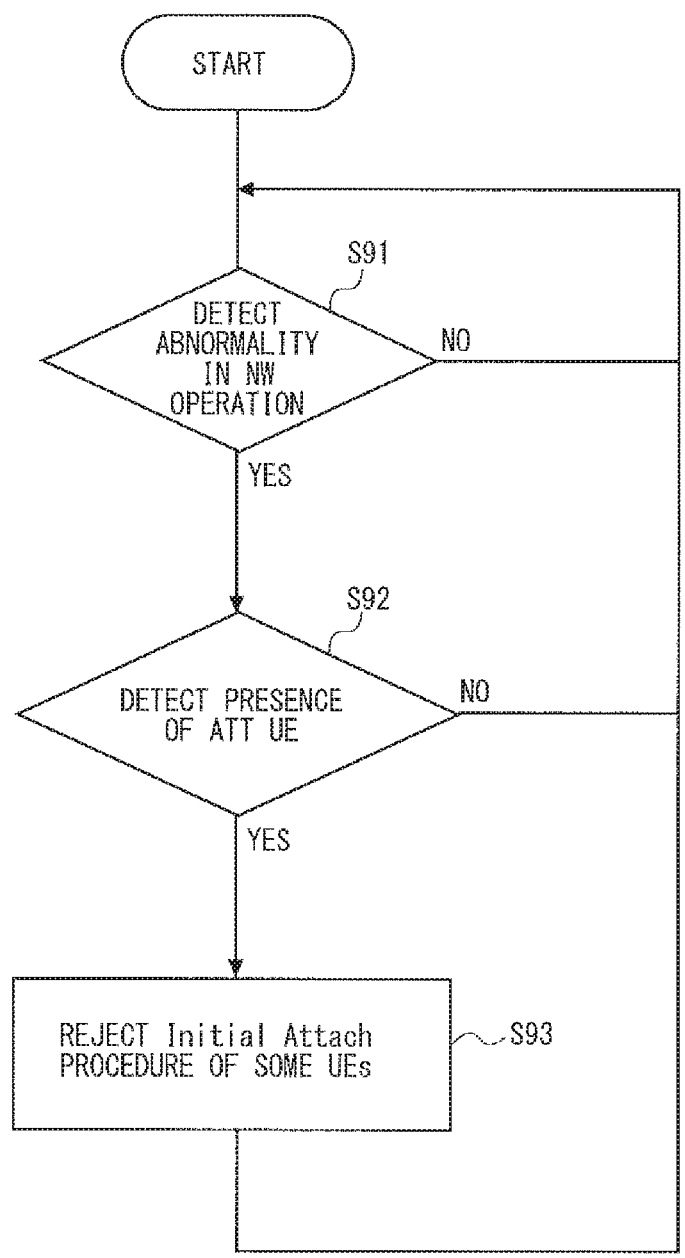
FIG. 9 is a diagram showing a flow of processing for defending against an attack from the UE in the eNB according to the second embodiment.

Next, a flow of processing for defending against attacks from the ATT UE 34 in the eNB 21 will be described with reference to FIG. 9. Firstly, the RRC signal monitor unit 71 determines whether an abnormality in the network operation has been detected from the generated statistical data (91). When RRC signal monitor unit 71 has not detected an abnormality in the network operation, it repeats the processing of Step S91. When the RRC signal monitor unit 71 detects an abnormality in the network operation, the NAS signal monitor unit 73 determines whether there is any ATT UE 34 (S92).

When the NAS signal monitor unit 73 determines that there is no ATT UE 34, it repeats the processing of Step S91. When the NAS signal monitor unit 73 estimates that there is an ATT UE 34, the signal control unit 74 rejects the Initial Attach procedure of some of the UEs located in the communication area formed by the eNB 21 (S93).

Figure 10:
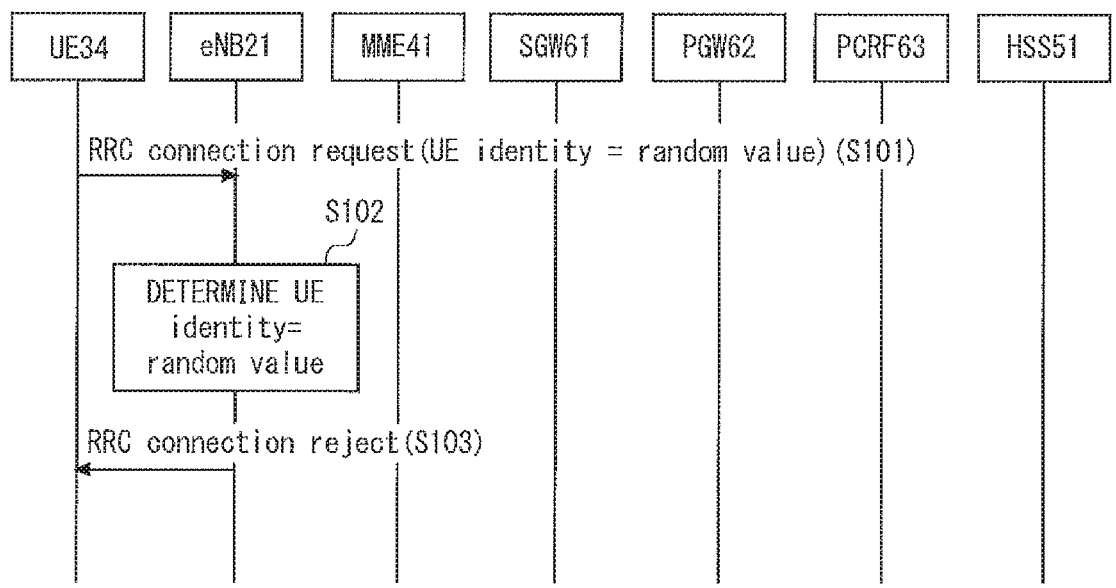
FIG. 10 is a diagram showing a flow of processing for defending against an attack from an ATT UE between the ATT UE and an eNB according to the second embodiment.

Next, a flow of processing when attacks from the ATT UE 34 are defended against between the ATT UE 34 and the eNB 21 will be described with reference to FIG. 10. FIG. 10 is a sequence related to Step S93 in FIG. 9. Firstly, the ATT UE 34 transmits the RRC connection Request message in which the UE identity=random value is set to the eNB 21 (S101).

Next, the eNB 21 determines that the UE identity=random value is set in the received RRC connection request message (S102). Next, the eNB 21 transmits an RRC connection Reject message to the ATT UE 34 (S103).

As described above, the eNB 21 according to the second embodiment of the present invention monitors the number of ATTACH reject messages and the number of Authentication reject messages received in a unit time to thereby estimate whether there is any ATT UE 34. When the eNB 21 estimates that there is an ATT UE 34, the eNB 21 rejects the Initial Attach procedure of the UE that has transmitted the RRC connection Request message in which the UE identity=random value is set. The ATT UE 34 is likely to be included in the UEs that have transmitted the RRC connection request message in which the UE identity random value. For this reason, the eNB 21 can defend against the attack by the ATT UE 34.

When the Initial Attach procedure of the UE having no intention of attacking the mobile network is rejected, the processing for rejecting the Initial Attach procedure on the UE that has transmitted the RRC connection Request message in which the UE identity=random value is set is canceled. Then, when the UE executes the Initial Attach procedure again, the Initial Attach procedure can be successfully completed. The operation of rejecting the Initial Attach procedure of the UE in which the UE identity=random value is set is performed only on the specific base station. Thus, when the UE having no intention of attacking the mobile network moves to an area outside the specific base station, the Initial Attach procedure of the UEs having no intention of attacking the mobile network can be successfully completed.

The UE that has transmitted the RRC connection Request message in which the UE identity=random value is set is the UE that is powered on for the first time, or the UE that roamed from another mobile network such as overseas. Thus, there is no influence on the service of the UE, on which the Initial Attach procedure has been successfully completed in the mobile network.

In the second embodiment, the configuration of the mobile network supporting the LTE in FIG. 2 has mainly been described. However, a mobile network supporting a second generation mobile phone system or a third generation mobile phone system shown in FIG. 11 may be used instead. The mobile network of FIG. 11 includes UEs 31 to 33, an ATT UE 34, NB (Node B) 23, an NB 24, an RNC 25, an SGSN 42, a GGSN 43, an HSS 51, and a PCRF 63. The NB 23 and the NB 24 are base stations supporting the wireless scheme used for the second generation mobile phone system and the third generation mobile phone system. The RNC 25 corresponds to the eNB 21 or the eNB 22, and is a control device for controlling a radio base station. The eNB 21 and the eNB 22 operate as base stations having functions corresponding to that of the RNC 25. The SGSN 42 corresponds to the MME 41. The SGSN 42 is a device that manages the location information of the UEs and transmits user data and the like. The GGSN 43 corresponds to the PGW 62.

Figure 8:
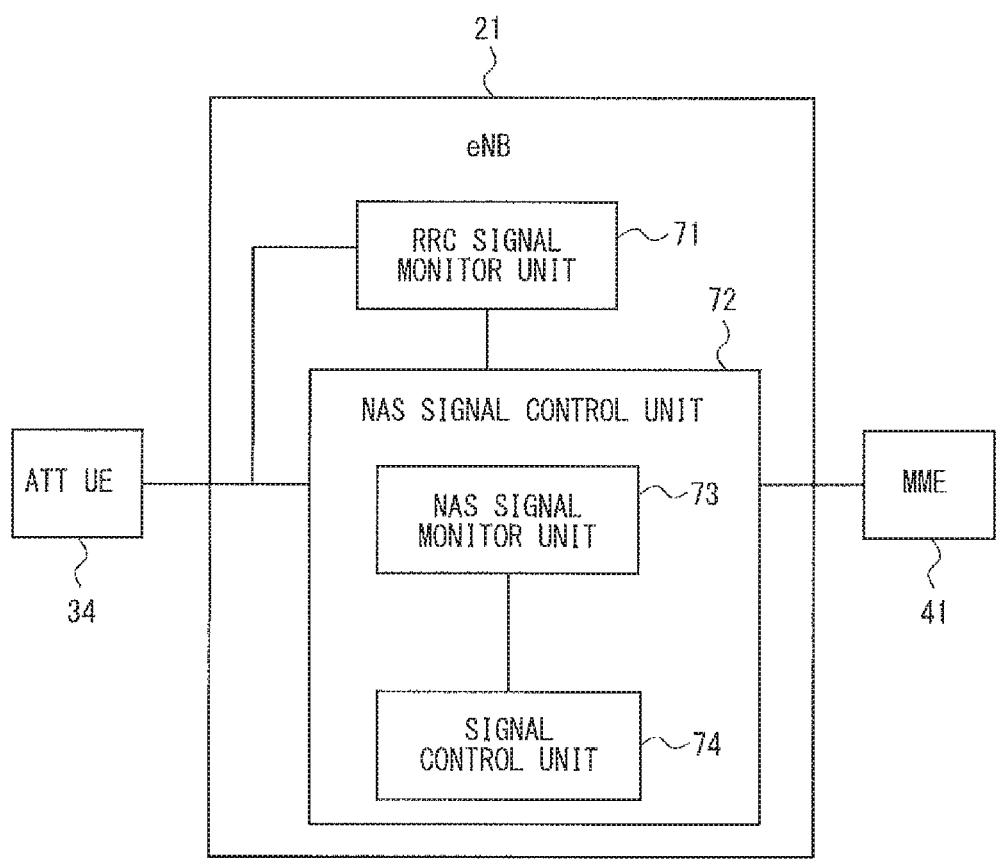
FIG. 8 is a configuration diagram of an eNB according to the second embodiment.
Figure 11:
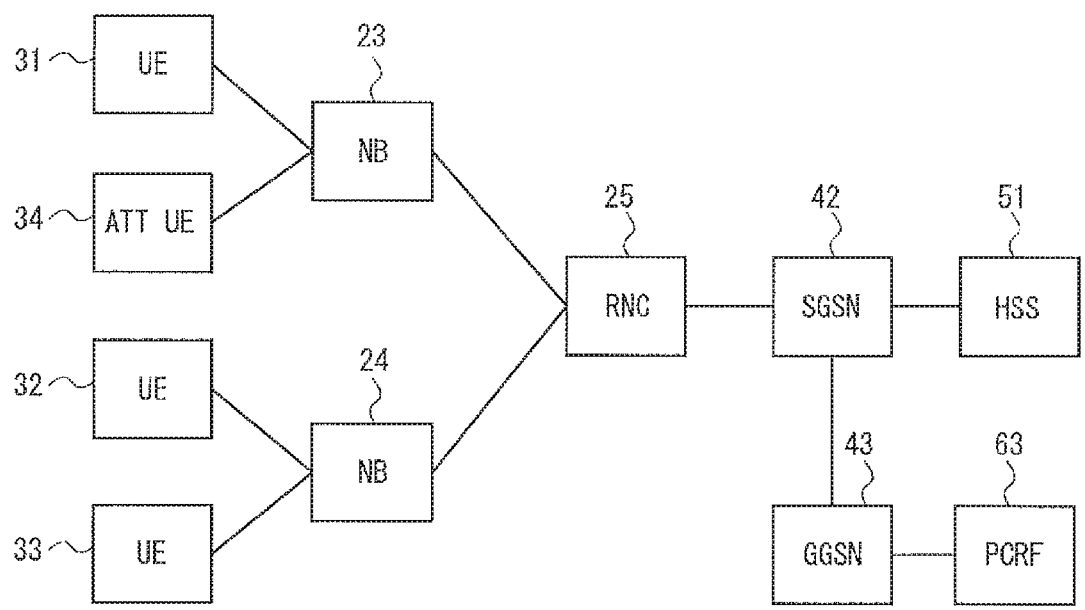
FIG. 11 is a configuration diagram of a mobile network according to the second embodiment.

In FIG. 11, the RNC 25 includes the RRC signal monitor unit 71 and the NAS signal control unit 72 in FIG. 8, and thus it can execute processing similar to that of the eNB 21 in FIG. 2.

As the attack methods other than the above (1) to (3), there may be the following attack methods. When the MME 41 transmits the Authentication Request message to the ATT UE 34 in Step S78 of FIG. 7, the ATT UE 34 disconnects the connection with the eNB 21 or intentionally avoids the processing and does not transmit a response message to the Authentication Request message. In this case, the MME 41 maintains a session with the ATT UE 34 for a certain period of time, so that the number of sessions managed by the MME 41 increases.

In such a case, the MME 41 retransmits the Authentication Request message after a lapse of a certain period of time. When the MME 41 does not receive a response message after the retransmission, it disconnects the session with the ATT UE 34 due to timeout. Thus, the NAS signal monitor unit 73 may estimate that there is the ATT UE 34 when the number of retransmitted messages or the number of time-outs exceeds a predetermined threshold per unit time.

Third Embodiment

Next, processing for estimating whether there is any ATT UE 34 according to the third embodiment will be described. The configuration of the eNB 21 according to the third embodiment is the same as that in FIG. 8, and thus a detailed description thereof will be omitted. In the third embodiment, the NAS signal monitor unit 73 monitors the number of ATTACH reject messages and the number of Authentication reject messages having a predetermined Cause value.

The Cause value indicates the reason for transmitting the ATTACH reject message or the Authentication reject message. For example, the NAS signal monitor unit 73 may monitor the number of ATTACH reject messages and the number of Authentication reject messages having a Cause value indicating that the UE executing the Initial Attach procedure is an illegal UE. The Cause value indicating that the UE is illegal may be, for example, the values shown in FIG. 12. FIG. 12 shows the Cause values indicating an illegal UE extracted from the Cause values shown in 3GPP TS 24.301 V13.3.0 (2015-09) Table 9.9.3.9.1: EMM cause information element.

As described above, the NAS signal monitor unit 73 counts only the number of ATTACH reject messages and the number of Authentication reject messages having the Cause value indicating that the UE is illegal among all the ATTACH reject messages and Authentication reject messages. Thus, for example, the eNB 21 does not count the Authentication reject message or the like that are generated, for example, when a failure occurs in the HSS. Therefore, when the number of ATTACH reject messages and the number of Authentication reject messages having the Cause value indicating that the UE is illegal exceeds the threshold, the eNB 21 can estimate the possibility that there is an ATT UE 34 more accurately as compared with the case where the number of all ATTACH reject messages and Authentication reject messages exceeds the threshold.

Fourth Embodiment

Next, a flow of processing when attacks from the ATT UE 34 are defended against between the ATT UE 34 and the eNB 21 will be described with reference to FIG. 13. Steps S111 to S113 are the same as Steps S21 to S23 of FIG. 2, respectively, and thus a detailed description thereof will be omitted.

When the eNB 21 receives the RRC connection setup complete message in Step S113, it determines that an IMSI within the range (specific range) of specific values is set in the UE identity that is set in the RRC connection setup complete message (S114). Next, the eNB 21 discards the RRC connection setup complete message received in Step S113 and stops the Initial Attach procedure (S115).

The eNB 21 may set the values of the specific range used in Step S114 as follows. For example, in the Initial Attach procedure in which the ATTACH reject message and the Authentication reject message are to be transmitted in Step S56 of FIG. 5, Step S67 of FIG. 6, and Step S81 of FIG. 7, the eNB 21 sets the width of the range values so as to include the IMSI. The number of IMSIs included in the range may be any number.

As described above, the eNB 21 discards the RRC connection setup complete message in which the IMSI, which falls within a specific range where the ATT UE 34 is likely to be included, is set. This enables the eNB 21 to defend against attacks from the ATT UE 34 on the mobile network.

Figure 5:
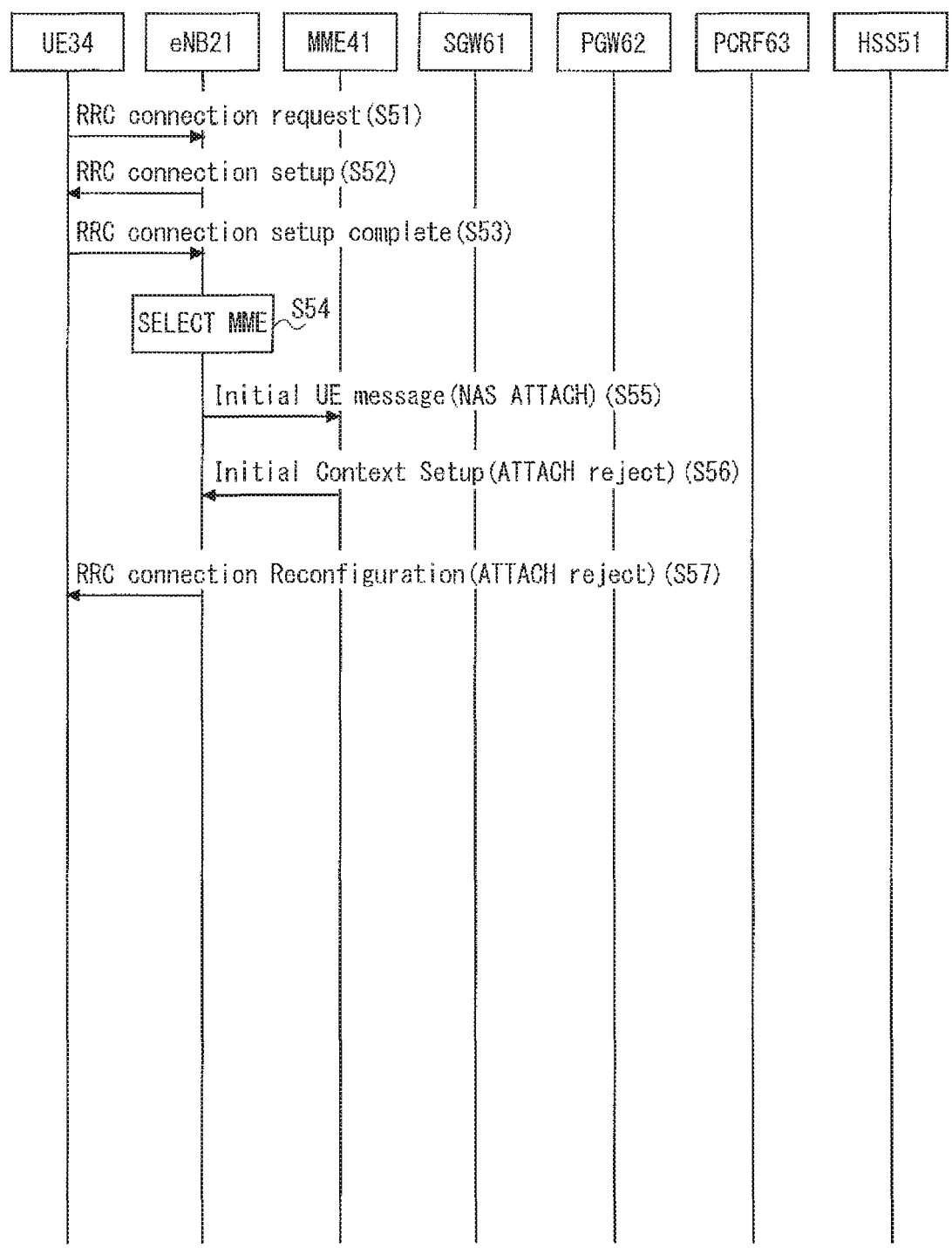
FIG. 5 is a diagram showing a flow of processing when a UE according to the second embodiment attacks.
Figure 13:
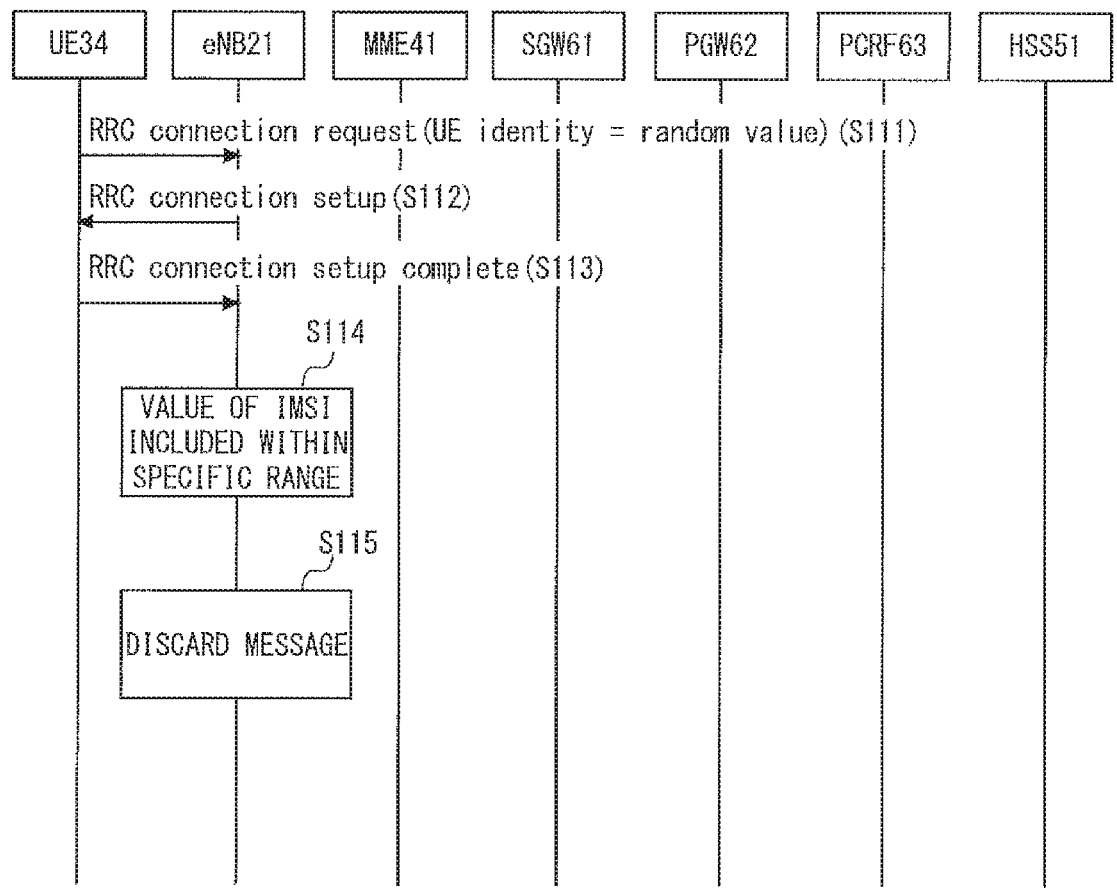
FIG. 13 is a diagram showing a flow of processing for defending against an attack from an ATT UE between an ATT UE and an eNB according to a fourth embodiment.

Even when the method of defending against attacks from the ATT UE 34 in FIGS. 10 and 13 is executed, if the number of messages related to the Initial Attach procedure does not decrease in the eNB 21, the Initial Attach procedures may be rejected uniformly for a certain period of time regardless of the UE identity set in the RRC connection request message in Step S21 of FIG. 5.

Further, even when the Initial Attach procedure is rejected for a certain period of time, if the number of messages related to the Initial Attach procedure does not decrease in the eNB 21, the transmission of radio waves of the eNB 21 estimated to be communicating with the ATT UE 34 may be stopped for a certain period of time or messages related to the Attach procedure may not be received in order to effectively defend against attacks from the ATT UE 34. Alternatively, when the NAS signal monitor unit 73 detects the frequency band accessed by the UE in the Initial Attach procedure in which the ATTACH reject message and the Authentication reject message have been transmitted, the transmission of radio waves of only the sector that supports the frequency band detected by the eNB 21 may be stopped.

Commonly, when the ATT UE 34 performs a DoS attack, and the processing load of the MME 41 increases, outgoing calls and the like are restricted in all the eNBs served by the MME 41, thereby exerting the influence of the DoS attack over a wide range. On the other hand, by stopping the transmission of radio waves of the eNB 21 estimated to be communicating with the ATT UE 34 for a certain period of time or stopping the transmission of radio waves of only some sectors of the eNB 21, the range on which the influence of the DoS attack is exerted can be narrowed.

Fifth Embodiment

Figure 14:
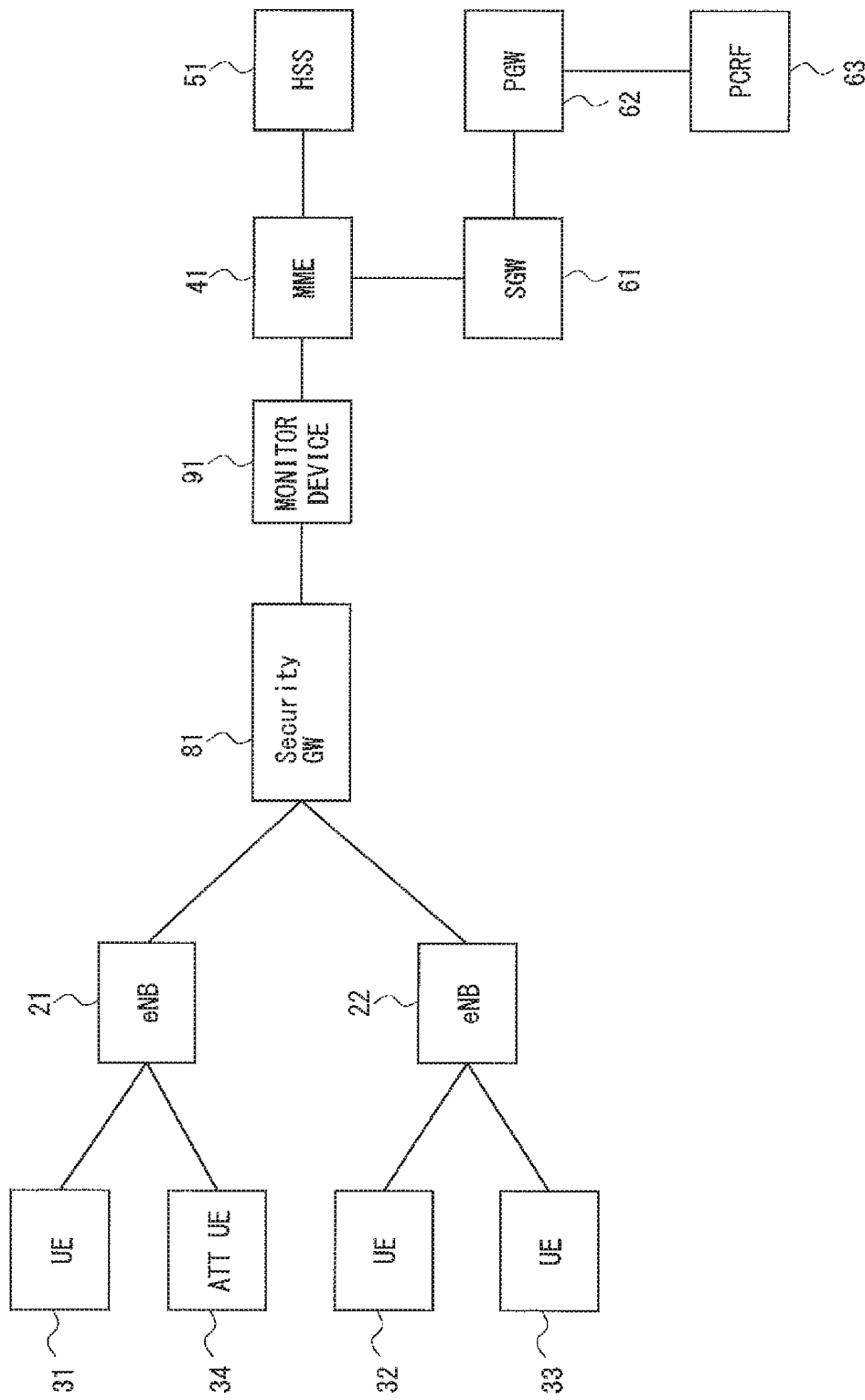
FIG. 14 is a configuration diagram of a mobile network according to a fifth embodiment.

Next, a configuration example of a mobile network different from those in FIGS. 2 and 11 will be described with reference to FIG. 14. The mobile network of FIG. 14 is the same as the mobile network of FIG. 2 except that the mobile network of FIG. 14 further includes a Security GW 81 and a monitor device 91. The Security GW 81 is connected to the eNB 21 and the eNB 22. The monitor device 91 relays communication between the Security GW 81 and the MME 41.

The communication paths between the eNB 21 and the Security GW 81 and between the eNB 22 and the Security GW 81 may be secured by IPsec.

The monitor device 91 is a device including the RRC signal monitor unit 71 and the NAS signal control unit 72 in FIG. 8. That is, the monitor device 91 determines whether there is any ATT UE 34, and decides to reject the Initial Attach procedures of some UEs served by the eNB communicating with the ATT UE 34.

Further, the monitor device 91 may be provided inside the Security GW 81 or inside the MME 41.

Figure 15:
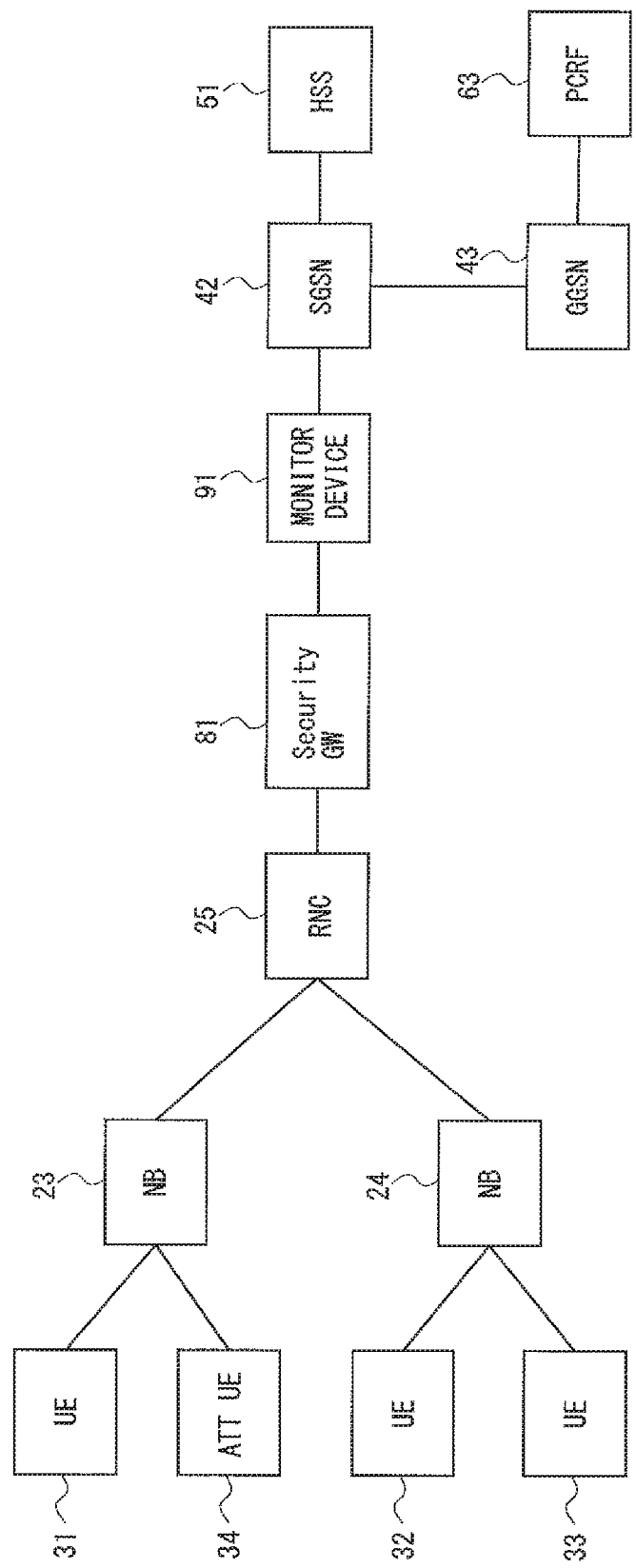
FIG. 15 is a configuration diagram of the mobile network according to the fifth embodiment.

Next, a configuration example of a mobile network different from those in FIGS. 2, 11, and 14 will be described with reference to FIG. 15. A configuration of the mobile network of FIG. 15 is the same as that of the mobile network of FIG. 11 except that the mobile network of FIG. 15 further includes a Security GW 81 and a monitor device 91. The Security GW 81 is connected to the RNC 25. The monitor device 91 relays communication between the Security GW 81 and the SGSN 42.

The monitor device 91 may be provided inside the Security GW 81 or inside the SGSN 42.

As shown in FIGS. 14 and 15, the monitor device 91 may be arranged in a previous stage of the MME 41 or the SGSN 42. This eliminates the need to incorporate the functions executed by the monitor device 91 into all the eNBs or RNCs in the mobile network as shown in FIG. 8. Thus, it is possible to easily incorporate the function for defending against the DoS attacks into the mobile network as compared with the case where the eNB executes the function of the monitor device 91 as shown in FIG. 8.

Figure 16:
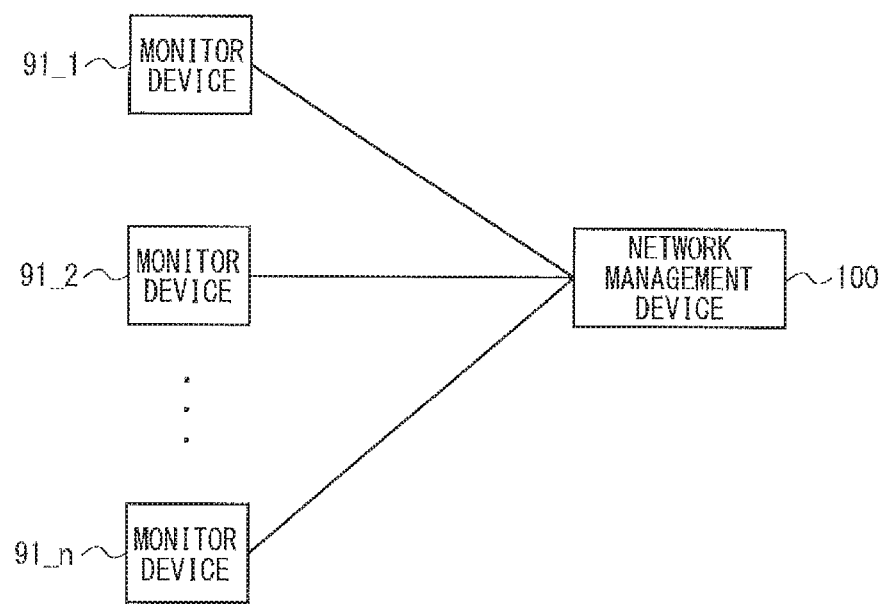
FIG. 16 is a configuration diagram of the mobile network according to the fifth embodiment.

As shown in FIG. 16, the network management device 100 may be configured to collectively manage a plurality of monitor devices 91. The network management device 100 may be referred to as an EMS (Element Management System) or an NMS (Network Management System). For example, in FIG. 14, the eNB 21 and eNB 22 may communicate with MMEs other than MME 41 in some cases. For example, the eNB 21 can select an MME for each UE in Step S54 of FIG. 5, and thus the eNB 21 can communicate with a plurality of MMEs.

The monitor device 91 connected to the Security GW 81 monitors the number of messages generated for each eNB by monitoring the messages transmitted from the eNB and the messages addressed to the eNB. However, as each eNB communicates with a plurality of MMEs, a message when am eNB communicates with another MME is monitored by another monitor device different from the monitor device 91.

Figure 17:
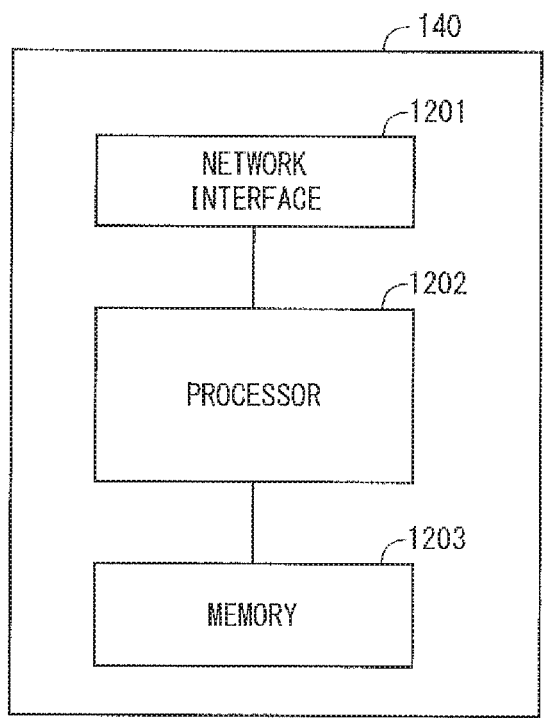
FIG. 17 is a configuration diagram of a node device in each embodiment.

Thus, the number of messages generated for each eNB cannot be accurately monitored by only one monitor device 91. For this reason, the network management device 100 that aggregates and manages a plurality of monitor devices 91 is used. The network management device 100 collects information about the number of messages generated for each eNB from the monitor devices 91_1 and 91_2, and 91_n (n is an integer of one or greater). The network management device 100 collects the information from a plurality of monitor devices and adds up the number of messages generated for each eNB, so that it can accurately monitor the number of messages generated for each eNB Next, a configuration of the node device constituting the communication systems shown in FIGS. 1, 2, 11, 14, 15, and 16 described in the above embodiments will be described with reference to FIG. 17. FIG. 17 is a block diagram showing a configuration example of the node device 140. Referring to FIG. 17, the node device 140 includes a network interface 1201, a processor 1202, and a memory 1203. The network interface 1201 is used to communicate with other network node devices constituting the communication system. The network interface 1201 may include, for example, a network interface card (NIC) compliant with IEEE 802.3 series.

The processor 1202 reads out and executes software (computer program) from the memory 1203 to thereby perform processing of the node device 140 described with reference to the sequence diagrams and flowcharts in the above embodiments. The processor 1202 may be, for example, a microprocessor, an MPU, or a CPU. The processor 1202 may include a plurality of processors.

The memory 1203 is composed of a combination of a volatile memory and a non-volatile memory. The memory 1203 may include a storage physically separated from the processor 1202. In this case, the processor 1202 may access the memory 1203 via an I/O interface not shown.

In the example of FIG. 17, the memory 1203 is used to store software modules. By reading and executing these software modules from the memory 1203, the processor 1202 can perform the processing of the server 140 described in the above embodiments.

As described with reference to FIG. 17, each of the processors of the node devices constituting the communication system executes one or more programs including instructions for causing a computer to execute the algorithm described with reference to the drawings.

In the above example, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), Compact Disc Read Only Memory (CD-ROM), CD-R, CD-R/W, semiconductor memories (such as Mask ROM, Programmable ROM (PROM), Erasable PROM (EPROM), flash ROM, Random Access Memory (RAM)). This program can be stored and provided to a computer using any type of non-transitory computer readable media. Non-transitory computer readable media include any type of tangible storage media. Non-transitory computer readable media can provide the program to a computer via a wired communication line (e.g. electric wires, and optical fibers) or a wireless communication line.

Note that the present invention is not limited to the above-described embodiments, and modifications can be made as appropriate without departing from the scope of the invention. The contents described in the first to fifth embodiments may be combined as appropriate. For example, the processing to estimate the presence of the ATT UE 34 in the second embodiment may be replaced with the processing to estimate the presence of the ATT UE 34 in the third embodiment. Moreover, the processing to defend against attacks from the ATT UE 34 in the second embodiment may be replaced with the processing to defend against attacks from the ATT UE 34 in the fourth embodiment.

Although the present invention has been described with reference to the embodiments, the present invention is not limited by the above. Various changes that can be understood by those skilled in the art within the scope of the invention can be made to the configuration and details of the present invention.

The whole or part of the exemplary embodiments disclosed above can be described as, but not limited to, the following supplementary notes.

(Supplementary Note 1)

A monitor device comprising:

a signal monitor unit configured to estimate a specific base station communicating with a communication terminal attacking a mobile network according to the number of times an ATTACH procedure is rejected, the ATTACH procedure being for registering information about the communication terminal communicating with a base station in a communication device located in the mobile network; and a base station control unit configured to cause the specific base station to determine whether to execute the ATTACH procedure related to a communication terminal served by the specific base station according to communication terminal identification information set in a signal transmitted from the communication terminal served by the specific base station.

(Supplementary Note 2)

The monitor device according to Supplementary note 1, wherein the communication device rejects the registration of the information about the communication terminal in which illegal communication terminal identification information is set in the communication device.

(Supplementary Note 3)

The monitor device according to Supplementary note 1, wherein the communication device rejects the registration of the communication terminal in the communication device when authentication information generated by the communication terminal does not match authentication information generated inside the mobile network.

(Supplementary Note 4)

The monitor device according to any one of Supplementary notes 1 to 3, wherein the signal monitor unit estimates the specific base station communicating with the communication terminal that attacks the mobile network according to the number of messages in which a predetermined Cause value is set among messages transmitted when the ATTACH procedure is rejected.

(Supplementary Note 5)

The monitor device according to any one of Supplementary notes 1 to 4, wherein the base station control unit causes the specific base station to reject processing for registering the information about the communication terminal, which has transmitted the signal in which the communication terminal identification information indicating that the communication terminal performs communication in the mobile network for the first time is set, in the communication device.

(Supplementary Note 6)

The monitor device according to any one of Supplementary notes 1 to 4, wherein the base station control unit causes the specific base station to reject processing for registering the information about the communication terminal, which has transmitted a signal in which an IMSI included in a determination value including at least one value is set, in the communication device as the communication terminal identification information.

(Supplementary Note 7)

The monitor device according to any one of Supplementary notes 1 to 6, wherein the base station control unit does not cause the specific base station to execute the processing for registering the information about the communication terminal served by the specific base station in the communication device.

(Supplementary Note 8)

The monitor device according to Supplementary note 7, wherein the base station control unit stops transmission of radio waves of the specific base station.

(Supplementary Note 9)

The monitor device according to any one of Supplementary notes 1 to 8, further comprising a radio signal monitor unit configured to generate statistical data related to the number of messages transmitted and received by the base station and activating the signal monitor unit and the base station control unit when there is a trend of traffic different from a trend of traffic indicated by the statistical data.

(Supplementary Note 10)

A base station comprising:

a signal monitor unit configured to estimate whether there is a communication terminal attacking a mobile network in a communication area according to the number of times an ATTACH procedure is rejected, the ATTACH procedure being for registering information about the communication terminal located in a communication area formed by the base station in a communication device; and a signal control unit configured to determine whether to execute the ATTACH procedure related to a communication terminal according to communication terminal identification information set in a signal transmitted from the communication terminal located in the communication area.

(Supplementary Note 11)

A monitor method comprising:

estimating a specific base station communicating with a communication terminal attacking a mobile network according to the number of times an ATTACH procedure is rejected, the ATTACH procedure being for registering information about the communication terminal communicating with a base station in a communication device located in the mobile network; and causing the specific base station to determine whether to execute the ATTACH procedure related to a communication terminal served by the specific base station according to communication terminal identification information set in a signal transmitted from the communication terminal served by the specific base station.

(Supplementary Note 12)

A control method comprising:

estimating whether there is a communication terminal attacking a mobile network in a communication area according to the number of times an ATTACH procedure is rejected, the ATTACH procedure being for registering information about the communication terminal located in a communication area formed by a base station in a communication device; and determining whether to execute the ATTACH procedure related to a communication terminal according to communication terminal identification information set in a signal transmitted from the communication terminal located in the communication area.

(Supplementary Note 13)

A program that causes a computer to:

estimate a specific base station communicating with a communication terminal attacking a mobile network according to the number of times an ATTACH procedure is rejected, the ATTACH procedure being for registering information about the communication terminal communicating with a base station in a communication device located in the mobile network; and cause the specific base station to determine whether to execute the ATTACH procedure related to a communication terminal served by the specific base station according to communication terminal identification information set in a signal transmitted from the communication terminal served by the specific base station.

(Supplementary Note 14)

A program that causes a computer to:

estimate whether there is a communication terminal attacking a mobile network in a communication area according to the number of times an ATTACH procedure is rejected, the ATTACH procedure being for registering information about the communication terminal located in a communication area formed by a base station in a communication device; and determine whether to execute the ATTACH procedure related to a communication terminal according to communication terminal identification information set in a signal transmitted from the communication terminal located in the communication area.

REFERENCE SIGNS LIST

10 MONITOR DEVICE
11 SIGNAL MONITOR UNIT
12 BASE STATION CONTROL UNIT
20 BASE STATION
21 eNB
22 eNB
23 NB
24 NB
25 RNC
30 COMMUNICATION TERMINAL
31 UE
32 UE
33 UE
34 ATT UE
40 COMMUNICATION DEVICE
41 MME
42 SGSN
43 GGSN
50 SUBSCRIBER DATA DEVICE
51 HSS
61 SGW
62 PGW
63 PCRF
71 RRC SIGNAL MONITOR UNIT
72 NAS SIGNAL CONTROL UNIT
73 NAS SIGNAL MONITOR UNIT
74 SIGNAL CONTROL UNIT
81 Security GW
91 MONITOR DEVICE
100 NETWORK MANAGEMENT DEVICE

The invention claimed is:

1. A monitor device comprising:
at least one memory storing instructions; and
at least one processor configured to execute the instructions to:
determine that a first communication terminal, configured to communicate with a base station, is misbehaving in a mobile network based on whether a NAS (Non-Access Stratum) message, which is transmitted from the first communication terminal for registering the first communication terminal with a communication device in the mobile network, is rejected by the base station, and based on a number of messages in which a specific cause value is set among messages transmitted from the base station in response to rejecting the NAS message by the base station; and
cause the base station to restrict from processing at least one RRC (Radio Resource Control) connection setup complete message transmitted from at least one second communication terminal served by the base station in a case in which a value of communication terminal identification information, set in the at least one RRC connection setup complete message is in a specific range,
wherein
the specific range is set in order to include a value of communication terminal identification information, assigned to the first communication terminal; and a threshold for determining that the first communication terminal is misbehaving is set based on a schedule for holding an event.

2. The monitor device according to claim 1, wherein the NAS message is rejected in a case in which communication terminal identification information, assigned to the first communication terminal, is illegal.

3. The monitor device according to claim 1, wherein the NAS message is rejected in a case in which authentication information generated by the first communication terminal does not match authentication information generated by the mobile network.

4. The monitor device according to claim 1, wherein the at least one processor is further configured to execute the instructions to cause the base station to restrict from processing the at least one RRC connection setup complete message in a case in which the value of the communication terminal identification information indicates that the at least one communication terminal which sent the at least one RRC connection setup complete message performs communication in the mobile network for a first time.

5. The monitor device according to claim 1, wherein the communication terminal identification information comprises an IMSI (International Mobile Subscriber Identity).

6. The monitor device according to claim 1, wherein the at least one processor is further configured to execute the instructions to cause the base station to restrict from processing all RRC connection setup complete messages for a specific period in a case in which the value of the communication terminal identification information set in the at least one RRC connection setup complete message is in the specific range.

7. The monitor device according to claim 6, wherein the at least one processor is further configured to execute the instructions to cause the base station to stop all transmission of radio waves for the specific period in a case in which the value of the communication terminal identification information set in the at least one RRC connection setup complete message is in the specific range.

8. The monitor device according to claim 1, wherein the at least one processor is further configured to execute the instructions to:
generate statistical data related to a number of messages transmitted and received by the base station;
determine that the first communication terminal is misbehaving; and
determine whether to process the NAS message in a case in which there is a trend of traffic different from a trend of traffic indicated by the statistical data.

9. The monitor device according to claim 1, wherein
the case in which the value of the communication terminal identification information set in the at least one RRC connection setup complete message is in the specific range comprises a case in which the value of the communication terminal identification information is a temporary value.

10. The monitor device according to claim 1, wherein the case in which the value of the communication terminal identification information set in the at least one RRC connection setup complete message is in the specific range comprises a case in which the value of the communication terminal identification information is a random value.

11. A base station comprising:
at least one memory storing instructions; and
at least one processor configured to execute the instructions to:
determine that a first communication terminal is misbehaving in a mobile network based on whether a NAS (Non-Access Stratum) message, which is transmitted from the first communication terminal for registering the first communication terminal with a communication device in the mobile network, is rejected, and based on a number of messages in which a specific cause value is set among message transmitted from the base station in response to rejecting the NAS message by the base station, and
determine whether to restrict from processing at least one RRC (Radio Resource Control) connection setup complete message transmitted from at least one second communication terminal served by the base station in a case in which a value of communication terminal identification information set in the at least one RRC connection setup complete message is in a specific range,
wherein:
the specific range is set in order to include a value of the communication terminal identification information, assigned to the first communication terminal; and
a threshold for determining that the first communication terminal is misbehaving is set based on a schedule for holding an event.

12. A monitor method comprising:
determining that a first communication terminal, configured to communicate with a base station, is misbehaving in a mobile network based on whether a NAS (Non-Access Stratum) message, which is transmitted from the first communication terminal for registering the first communication terminal with a communication device in the mobile network, is rejected by the base station, and based on a number of messages in which a specific cause value is set among messages transmitted from the base station in response to rejecting the NAS message by the base station; and
causing the base station to restrict from processing at least one RRC (Radio Resource Control) connection setup complete message transmitted from at least one second communication terminal served by the base station in a case in which a value of communication terminal identification information, set in the at least one RRC connection setup complete message is in a specific range,
wherein:
the specific range is set in order to include a value of communication terminal identification information, assigned to the first communication terminal; and
a threshold for determining that the first communication terminal is misbehaving is set based on a schedule for holding an event.

13. The monitor method according to claim 12, wherein, the case in which the value of the communication terminal identification information set in the at least one RRC connection setup complete message is in the specific range comprises a case in which the value of the communication terminal identification information is a temporary value.

14. The monitor method according to claim 12, wherein the case in which the value of the communication terminal identification information set in the at least one RRC connection setup complete message is in the specific range comprises a case in which the value of the communication terminal identification information is a random value.

15. A control method for a base station, the control method comprising:
   determining that a first communication terminal is misbehaving in a mobile network based on whether a NAS (Non-Access Stratum) message, which is transmitted from the first communication terminal for registering the first communication terminal with a communication device in the mobile network, is rejected, and based on a number of message in which a specific cause value is set among messages transmitted from the base station in response to rejecting the NAS message by the base station, and
   determining whether to restrict from processing at least one RRC (Radio Resource Control) connection setup complete message, transmitted from at least one second communication terminal served by the base station, in a case in which a value of communication terminal identification information set in the at least one RRC connection setup complete message is in a specific range,
   wherein:
   the specific range is set in order to include a value of communication terminal identification information, assigned to the first communication terminal; and
   a threshold for determining that the first communication terminal is misbehaving is set based on a schedule for holding an event.

* * * * *